United States Patent
Peker et al.

(10) Patent No.: US 8,461,764 B2
(45) Date of Patent: Jun. 11, 2013

(54) SAMPLING EXTERNAL VOLTAGE WHICH MAY EXCEED INTEGRATED CIRCUIT MAXIMUM VOLTAGE RATING

(75) Inventors: Arkadiy Peker, Glen Cove, NY (US); Dror Korcharz, Bat Yam (IL); Paul Okada, Foothill Ranch, CA (US)

(73) Assignee: Microsemi Corporation, Aliso Viejo, CA (US)

( * ) Notice: Subject to any disclaimer, the term of this patent is extended or adjusted under 35 U.S.C. 154(b) by 295 days.

(21) Appl. No.: 13/083,618

(22) Filed: Apr. 11, 2011

(65) Prior Publication Data
US 2011/0248639 A1 Oct. 13, 2011

Related U.S. Application Data

(60) Provisional application No. 61/322,312, filed on Apr. 9, 2010.

(51) Int. Cl.
*H05B 37/00* (2006.01)

(52) U.S. Cl.
USPC .................. 315/185 R; 315/192; 315/193

(58) Field of Classification Search
USPC .............. 315/185 R, 192, 193, 194, 216, 308
See application file for complete search history.

(56) References Cited

U.S. PATENT DOCUMENTS

| | | | |
|---|---|---|---|
| 6,411,483 B1 | 6/2002 | Saries et al. | |
| 6,621,235 B2 * | 9/2003 | Chang | 315/216 |
| 7,081,722 B1 * | 7/2006 | Huynh et al. | 315/323 |
| 7,550,934 B1 | 6/2009 | Deng et al. | |
| 8,405,320 B2 * | 3/2013 | Huang et al. | 315/291 |
| 2006/0108933 A1 * | 5/2006 | Chen | 315/86 |
| 2007/0013321 A1 | 1/2007 | Ito et al. | |
| 2007/0195025 A1 | 8/2007 | Korcharz et al. | |
| 2008/0018266 A1 * | 1/2008 | Yu et al. | 315/291 |
| 2008/0164828 A1 | 7/2008 | Szczeszynski et al. | |
| 2010/0134018 A1 * | 6/2010 | Tziony et al. | 315/122 |
| 2010/0283397 A1 * | 11/2010 | Chen et al. | 315/192 |
| 2011/0068700 A1 * | 3/2011 | Fan | 315/185 R |
| 2013/0038227 A1 * | 2/2013 | Yan et al. | 315/186 |

OTHER PUBLICATIONS

International Search Report for PCT/US2011/031489—European Patent Office mailed Jun. 30, 2011.
Written Opinion for PCT/US2011/031489—European Patent Office mailed Jun. 30, 2011.
MAX16826 Data Sheet—Published Mar. 2009 by Maxim Integrated Products.
Linfinity Application Note AN-8—Hiccup Mode Current Limiting, published Jul. 1998 by Linfinity Microelectronics.
Maxim Application Note 1901—Convert the MAX1937/8/9 from Latch Off Mode to Hiccup Mode Under Short Circuit Condition, published Feb. 27, 2004 by Maxim Integrated Products.
MAX16809 Evaluation Kit Data Sheet—published Jul. 2006 by Maxim Integrated Products.

* cited by examiner

*Primary Examiner* — Thienvu Tran
(74) *Attorney, Agent, or Firm* — Simon Kahn

(57) ABSTRACT

An LED driver arrangement wherein a low voltage IC is arranged to sample the voltage at a terminal of each of the respective electronically controlled switches controlling a plurality of LED strings each receiving power from a single source, with the single source providing voltage in excess of the voltage rating of the IC. For each electronically controlled switch a controllable current source and an isolating unidirectional electronic valve is provided, the respective current source being enabled only when the respective associated electronically controlled switch is at least partially closed thereby ensuring that the respective isolating unidirectional electronic valve associated with the respective illuminating LED string conducts, and the voltage at the terminal of the respective electronically controlled switch is thus seen by the IC when the associated LED string is producing illumination, the voltage then being lower than the maximum voltage rating of the IC.

20 Claims, 2 Drawing Sheets

SAMPLING EXTERNAL VOLTAGE WHICH MAY EXCEED INTEGRATED CIRCUIT MAXIMUM VOLTAGE RATING

TECHNICAL FIELD

The present invention relates to the field of LED lighting, and particularly to a driving arrangement for a plurality of LED strings in which an external current limiter, exposed to high voltage is sampled by an integrated circuit which must be isolated from any high voltage.

BACKGROUND

Light emitting diodes (LEDs) and in particular high intensity and medium intensity LED strings are rapidly coming into wide use for lighting applications. LEDs with an overall high luminance are useful in a number of applications including backlighting for liquid crystal display (LCD) based monitors and televisions, collectively hereinafter referred to as a matrix display, as well as for general lighting applications.

In a large LCD matrix display, and in large solid state lighting applications, such as street lighting, typically the LEDs are supplied in a plurality of strings of serially connected LEDs, at least in part so that in the event of failure of one string at least some light is still output. The constituent LEDs of each LED string thus share a common current.

In order to supply a white backlight for the matrix display one of two basic techniques are commonly used. In a first technique strings of "white" LEDs are utilized, the white LEDs typically comprising a blue LED with a phosphor which absorbs the blue light emitted by the LED and emits a white light. In a second technique individual strings of colored LEDs are placed in proximity so that in combination their light is seen as a white light. Often, two strings of green LEDs are utilized to balance each single red and blue LED string.

In either of the two techniques, the strings of LEDs are in one embodiment located at one end or one side of the matrix display, the light being diffused to appear behind the LCD by a diffuser. In another embodiment the LEDs are located directly behind the LCD, the light being diffused by a diffuser so as to avoid hot spots. In the case of colored LEDs, a mixer is further required, which may be part of the diffuser, to ensure that the light of the colored LEDs is not viewed separately, but rather mixed to give a white light. The white point of the light is an important factor to control, and much effort in design and manufacturing is centered on the need to maintain a correct white point in the event that colored LEDs are utilized.

LEDs providing high luminance exhibit a range of forward voltage drops, denoted $V_f$, and their luminance is primarily a function of current. For example, one manufacturer of LEDs suitable for use with a portable computer, such as a notebook computer, indicates that $V_f$ for a particular high luminance white LED ranges from 2.95 volts to 3.65 volts at 20 mA and an LED junction temperature of 25° C., thus exhibiting a variance in $V_f$ of greater than ±10%. Furthermore, the luminance of the LEDs vary as a function of junction temperature and age, typically exhibiting a reduced luminance as a function of current with increasing temperature and increasing age. In order to provide backlight illumination for a portable computer with an LCD matrix display of at least 25 cm measured diagonally, at least 20, and typically in excess of 40, LEDs are required. In order to provide street lighting, in certain applications over 100 LEDs are required.

In order to provide a balanced overall luminance, it is important to control the current of the various LED strings to be approximately equal. In one embodiment, as described in U.S. patent application Ser. No. 11/676,313 to Korcharz et al, entitled "Voltage Controlled Backlight Driver", filed Feb. 19, 2007 and published as US 2007/0195025 on Aug. 23, 2007, the entire contents of which is incorporated herein by reference, this is accomplished by a controlled dissipative element placed in series with each of the LED strings, the controlled dissipative element further acting as an enable/disable control for the LED string, which may be advantageously driven by a pulse width modulation (PWM) signal. Additionally, a power source supplying power to a plurality of LED strings is controlled responsive to a function of an electrical characteristic of at least one of the plurality of LED strings receiving power from the power source. The controlled dissipative element is typically embodied in a metal-oxide semiconductor field effect transistor (MOSFET), which may be provided either within the LED driving control integrated circuit, or externally thereof.

In order to ensure that the current flowing through the plurality of LED strings are equal, and to control the power source as described above, it is necessary to sample the voltage at one or more terminals of each of the dissipative elements. In the event that the power source is arranged to produce a voltage in excess of the voltage rating of the LED driving control integrated circuit (IC), care must be taken to ensure that the excess voltage is not experienced by the LED driving control IC. This is particularly acute when external MOSFETs are used. A voltage divider arrangement is known to be used to adjust high voltages for sampling by lower voltage ICs, however in the case of LED strings this is disadvantageous, since the low leakage current passing through the LED strings via the voltage divider produces a weak illumination even when the LED string is to be disabled via the dissipative element, or other switch.

SUMMARY

In view of the discussion provided above and other considerations, the present disclosure provides methods and apparatus to overcome some or all of the disadvantages of prior and present LED string driver arrangements. Other new and useful advantages of the present methods and apparatus will also be described herein and can be appreciated by those skilled in the art.

This is provided in certain embodiments by an LED driver arrangement wherein a low voltage IC is arranged to sample the voltage at a terminal of each of the respective dissipative electronically controlled switches controlling a plurality of LED strings each receiving power from a single source, with the single source providing voltage in excess of the voltage rating of the IC. For each electronically controlled switch a controllable current source and an isolating unidirectional electronic valve is provided, the respective current source being enabled only when the respective associated electronically controlled switch is at least partially closed, thereby ensuring that the respective isolating unidirectional electronic valve associated with the respective illuminating LED string conducts in the event the respective isolating unidirectional electronic valve is forward biased, and the voltage at the terminal of the respective electronically controlled switch is thus seen by the IC when the associated LED string is producing illumination, the voltage then being at a voltage lower than the voltage rating of the IC.

In one embodiment, a light emitting diode (LED) driver arrangement is provided, the LED driver arrangement comprising: a control circuit; a power source; a plurality of LED strings, a first end of each of the plurality of LED strings coupled to a common output of the power source; a plurality of controllable current sources, each responsive to the control circuit; a plurality of electronically controlled switches, a control terminal of each of the plurality of electronically controlled switches coupled to a respective output of the control circuit; and a plurality of isolating unidirectional electronic valves, each of the plurality of controllable current sources, the plurality of electronically controlled switches and the plurality of isolating unidirectional electronic valves mutually associated with a respective one of the plurality of LED strings, a first terminal of each of the plurality of electronically controlled switches coupled to a second end of the respective associated LED string, a first end of each of the plurality of isolating unidirectional electronic valves coupled to the respective associated controllable current source and a second end of each of the plurality of isolating unidirectional electronic valves coupled to the first terminal of the respective associated electronically controlled switch, each of the plurality of isolating unidirectional electronic valves arranged to conduct only when the electric potential at the second end is lower than the electric potential at the first end, the control circuit arranged to alternately open and close each of the plurality of electronically controlled switches, each of the respective associated LED strings thereby producing illumination when the associated electronically controlled switch is at least partially closed, and the control circuit further arranged to operate the respective controllable current source only when the respective associated electronically controlled switch is at least partially closed.

In one further embodiment the LED driver further comprises: a first comparing circuit, each of the inputs of the first comparing circuit coupled to the first end of a respective one of the plurality of isolating unidirectional electronic valves, the respective isolating unidirectional electronic valve arranged to couple a voltage appearing at the first terminal of the associated electronically controlled switch to the respective input of the first comparing circuit when the respective isolating unidirectional electronic valve conducts responsive to the respective associated controllable current source; and a power controlling module arranged to control the output voltage of the power source, the power controlling module responsive to the output of the first comparing circuit.

In another further embodiment, the LED driver arrangement further comprises: a first comparing circuit, each of the inputs of the first comparing circuit coupled to the first end of a respective one of the plurality of isolating unidirectional electronic valves, the respective isolating unidirectional electronic valve arranged to couple a voltage appearing at the first terminal of the associated electronically controlled switch to the respective input of the first comparing circuit when the respective isolating unidirectional electronic valve conducts responsive to the respective associated controllable current source; a steering module responsive to the first comparing circuit, each of the inputs of the steering module coupled to a respective input of the first comparing circuit, the steering module arranged to output a signal whose value represents a voltage appearing on the first terminal of a particular one of the associated electronically controlled switches, the particular one selected responsive to the first comparing circuit; and a power controlling module arranged to control the output voltage of the power source responsive to the output signal.

In one yet further embodiment, the LED driver arrangement further comprises a plurality of compensating unidirectional electronic valves, each of the compensating unidirectional electronic valves coupled between a respective one of the isolating electronically controlled valves and the respective input of the steering circuit, and arranged to compensate for the voltage drop across the respective isolating electronically controlled valve. In one yet even further embodiment, the first comparing circuit is arranged to identify the input exhibiting the lowest voltage, and set the steering module to select the identified input exhibiting the lowest voltage.

In one yet further embodiment, the first comparing circuit is arranged to identify the input exhibiting the lowest voltage, and set the steering module to select the identified input exhibiting the lowest voltage. In another yet further embodiment, the LED driver arrangement further comprises: an error amplifier coupled to the output of the steering module, the error amplifier arranged to compare the output signal of the steering module with a reference and output a feedback error signal to the power controlling module reflective of the difference between the output of the steering module and the reference, the arrangement to control the output voltage of the power source responsive to the output signal being responsive to the output feedback error signal.

In one yet even further embodiment, the LED driver arrangement further comprises a start up bypass, the start up bypass arranged to increase the rate of response of the power controlling module to the feedback error signal during a start up phase. In another yet even further embodiment, the LED driver arrangement further comprises a sample and hold circuit coupled to the output of the error amplifier and arranged to sample and hold the feedback error signal, the power controlling module receiving the sampled and held feedback error signal.

In one yet further embodiment, the LED driver arrangement further comprises a second comparing circuit each of the inputs of the second comparing circuit coupled to the first end of a respective one of the plurality of isolating unidirectional electronic valves, the respective isolating unidirectional electronic valve arranged to couple a voltage appearing at the first terminal of the associated electronically controlled switch to the respective input of the second comparing circuit when the isolating unidirectional electronic valve conducts responsive to the respective associated current source, the second comparing circuit arranged to compare each of the respective inputs with a short circuit reference, and output an error signal when any of the inputs exceeds the short circuit reference.

In one independent embodiment, a method of controlling and sampling a plurality of light emitting diode (LED) strings coupled to a single power source is provided, the method comprising: providing a plurality of LED strings, a first end of each of the plurality of LED strings coupled to a common output of the power source; providing a plurality of electronically controlled switches; providing a plurality of isolating unidirectional electronic valves, each of the provided plurality of electronically controlled switches and the provided plurality of isolating unidirectional electronic valves mutually associated with a respective one of the provided plurality of LED strings, each of the provided plurality of electronically controlled switches in communication with the associated LED string and the associated isolating unidirectional electronic valve; alternately opening and closing each of the plurality of provided electronically controlled switches, each of the respective associated provided LED strings producing illumination when the associated provided electronically controlled switch is at least partially closed; driving a current through the respective provided isolating electronic valve only when the respective electronically controlled switch is at least partially closed; and sampling a terminal voltage of the respective associated provided electronically controlled switch via the respective associated provided isolating unidirectional electronic valve responsive to the driven current through the respective associated provided isolating electronic valve.

In one further embodiment, the method further comprises: comparing the sampled terminal voltages of the provided plurality of electronically controlled switches; selecting a particular one of the provided electronically controlled switches responsive to a particular condition of the comparing; and controlling the output voltage of the single power source responsive to the sampled terminal voltage of the selected particular one of the provided electronically controlled switches.

In one yet further embodiment, the method further comprises: compensating for the voltage drop of the respective isolating unidirectional electronic valve associated with the selected particular one of the provided electronically controlled switches. In another yet further embodiment, the particular condition is the lowest voltage.

In one yet even further embodiment, the method further comprises: comparing a function of the sampled terminal voltage of the selected particular one of the provided electronically controlled switches with a reference voltage to develop a feedback error signal, the value of the feedback error signal reflecting the difference between the compared function of the sampled terminal voltage and the reference voltage, wherein the controlling the output voltage is responsive to the developed feedback error signal. In one yet even further embodiment, the method further comprises increasing the impact of the feedback error signal on the output voltage during a start up phase.

In one yet further embodiment, the method further comprises: comparing each of the sampled terminal voltages with a short circuit reference; and producing an error signal when any of the inputs exceeds the short circuit reference.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
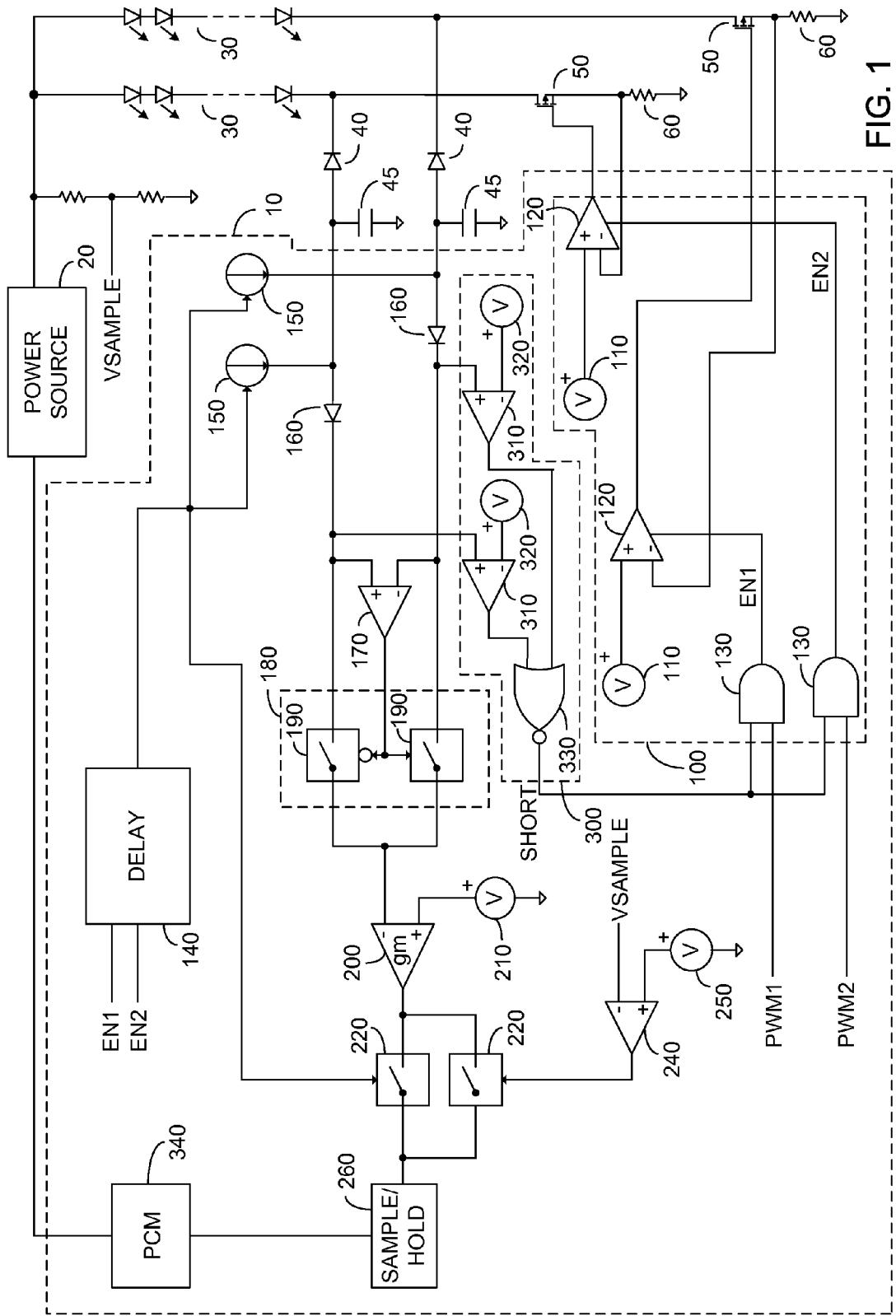
FIG. 1 illustrates a high level schematic diagram of an exemplary embodiment of an LED driver arrangement.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting. The term connected as used herein is not meant to be limited to a direct connection, and the use of appropriate resistors, capacitors and inductors does not exceed the scope thereof.

FIG. 1 illustrates a high level schematic diagram of an exemplary embodiment of an LED driver arrangement comprising: an LED driver 10 preferably implemented as an integrated circuit; a controllable power source 20; a plurality of LED strings 30; a plurality of isolating unidirectional electronic valves 40, illustrated without limitation as diodes; a plurality of capacitors 45, each associated with a particular isolating unidirectional electronic valve 40; a plurality of electronically controlled switches 50, illustrated without limitation as NMOSFETs; and a plurality of sense resistors 60. Led driver 10 comprises a control circuit 100, comprising: a plurality of target current reference voltage sources 110; a plurality of comparing circuits 120; and a plurality of AND gates 130. LED driver 10 further comprises: a delay circuitry 140; a plurality of controllable current sources 150; a plurality of compensating unidirectional electronic valves 160, illustrated without limitation as diodes; a comparing circuit 170; a steering module 180 comprising a plurality of electronically controlled switches 190; a transconductance error amplifier 200 with an associated reference voltage source 210; a first and a second electronically controlled switch 220; a comparing circuit 240 with an associated reference voltage source 250; a sample and hold circuit 260; a short circuit detector 300 comprising a plurality of comparing circuits 310, a plurality of short circuit reference voltage sources 320, each associated with a particular comparing circuit 310, and a NOR gate 330; and a power controlling module 340. Each of the plurality of controllable current sources 150, plurality of isolating unidirectional electronic valves 40; plurality of electronically controlled switches 50; plurality of electronically controlled switches 190; plurality of comparing circuits 120; plurality of target current reference voltage sources 110; plurality of compensating unidirectional electronic valves 160; and plurality of comparing circuits 310 is mutually associated with a respective one of the plurality of LED strings 30. The LED driver arrangement of FIG. 1 is illustrated as comprising two LED strings 30 and will be described as such, however this is not meant to be limiting in any way and any number of LED string 30 can be provided without exceeding the scope.

The output of power source 20 is connected to a first end of each of the plurality of LED strings 30, particularly illustrated as the anode end of each LED string 30, and a resistor divider is further connected to the output of power source 20. The divided output of power source 20 is denoted VSAMPLE and is fed to the inverting input of comparing circuit 240. The second end of each LED string 30 is connected to the cathode of a respective isolating unidirectional electronic valve 40 and to a first terminal of a respective electronically controlled switch 50, illustrated as the drain of the MOSFET implementation. The second terminal of each of the respective electronically controlled switches 50, illustrated as the source of the MOSFET implementation, is connected to the inverting input of the respective comparing circuit 120, and via the respective sense resistor 60 to a common potential. The non-inverting input of each comparing circuit 120 is connected to the output of the respective target current reference voltage source 110, and the output of each comparing circuit 120 is connected to the control terminal of the respective electronically controlled switch 50, illustrated as the gate of the MOSFET implementation.

The anode of each of the respective isolating unidirectional electronic valves 40 is connected via the respective capacitor 45 to the common potential, to the output of a respective controllable current source 150 and to the anode of a respective compensating unidirectional electronic valve 160. The cathode of a first compensating unidirectional electronic valve 160 is connected to the non-inverting input of comparing circuit 170, to a first terminal of a first electronically controlled switch 190 and to the non-inverting input of a respective comparing circuit 310. The cathode of a second compensating unidirectional electronic valve 160 is connected to the inverting input of comparing circuit 170, to a first terminal of a second electronically controlled switch 190 and to the non-inverting input of a respective comparing circuit 310. Comparing circuit 170 is illustrated as a comparator arranged to compare two inputs, however this is not meant to be limiting in any way, and a comparing circuit comparing three or more inputs is specifically contemplated.

The output of comparing circuit 170 is connected to the control input of each of first and second electronically controlled switches 190. First electronically controlled switch 190 and second electronically controlled switch 190 are responsive to complementary logic values. The second terminal of each of first and second electronically controlled switches 190 are connected to the inverting input of transconductance error amplifier 200, and the non-inverting input of transconductance error amplifier 200 is connected to the output of reference voltage source 210. The output of transconductance error amplifier 200 is connected to a first terminal of each of first and second electronically controlled switches 220. A second terminal of each of first and second electronically controlled switches 220 is connected to the input of sample and hold circuit 260, which in an exemplary embodiment is constituted of an RC filter external of LED driver 10 (not shown). The output of sample and hold circuit 260 is connected to an input of power controlling module 340 and the output of power controlling module is connected to the control input of power source 20.

The output of each short circuit reference voltage source 320 is connected to the inverting input of the respective comparing circuit 310, and the output of each comparing circuit 310 is connected to a respective input of NOR gate 330. The output of NOR gate 330, denoted SHORT, is connected to a first input of each AND gate 130. The second input of first AND gate 130 is connected to a received first PWM signal, denoted PWM1, and the second input of second AND gate 130 is connected to a received second PWM signal, denoted PWM2. The output of first AND gate 130, denoted EN1, is connected to an enable input of first comparing circuit 120 and to a respective input of delay circuit 140. The output of second AND gate 130, denoted EN2 is connected to an enable input of second comparing circuit 120 and to a respective input of delay circuit 140.

The output of delay circuit 140 is connected to the control input of each controllable current source 150 and to the control input of first electronically controlled switch 220. The non-inverting input of comparing circuit 240 is connected to reference voltage source 250, and the output of comparing circuit 240 is connected to the control input of second electronically controlled switch 220.

PWM1 and PWM2 are illustrated as received pulse width modulation (PWM) signals, however this is not meant to be limiting in any way. In one embodiment LED driver 10 comprises a PWM generating functionality, preferably further comprising a staggering functionality arranged to output PWM1 and PWM2 with a respective time delay between the beginning of the periods of each of PWM1 and PWM2.

In an exemplary embodiment (not shown), a single target current reference voltage source 110 is provided, target current reference voltage source 110 comprising a current source and a serially connected resistor, the resistor provided external of LED driver 10. In an exemplary embodiment (not shown), a single short circuit reference voltage source 320 is provided, short circuit reference voltage source 320 comprising a current source and a serially connected resistor, the resistor provided external of LED driver 10. In an exemplary embodiment (not shown), each of reference voltage sources 210 and 250 comprise a current source and a serially connected resistor, the resistor provided external of LED driver 10.

In operation, each of LED strings 30 provides illumination responsive to the respective PWM signal, i.e. PWM1 and PWM2. High voltage appearing at the drain of the respective electronically controlled switches 50 is isolated from the voltage circuitry of LED driver 10 by isolating unidirectional electronic valves 40. Delay circuit 140 provides an active output with a predetermined delay after both PWM1 and PWM2 are active, thus ensuring the current through each of the respective electronically controlled switches 50 is stable, and any turn on transients have dissipated. Delay circuit 140 enables controllable current sources 150, which are operative to drive current through the respective isolating unidirectional electronic valves 40, thus passing a voltage representation of the voltage appearing at the drain of the respective electronically controlled switch 50 to the inputs of comparing circuit 170, the inputs of steering module 180 and the inputs of short circuit detector 300. Thus, voltage appearing at the drain of each electronically controlled switch 50 appears at LED driver 10 only when both electronically controlled switches 50 are conducting, and after transient settlement. Furthermore, voltage appearing at the drain of each electronically controlled switch 50 appears at LED driver 10 only when the voltage is lower than the voltage across the respective capacitor 45. Controllable current source 150 ensures that the respective isolating unidirectional electronic valve 40 conducts, by driving current there through. The terminal voltage sampled by LED driver 10 thus does not exceed the maximum voltage rating of LED driver 10 which, as described above, is preferably implemented as an integrated circuit.

Compensating unidirectional electronic valves 160 compensate for the voltage drop across the respective isolating unidirectional electronic valve 40, so that short circuit detector 300 and transconductance error amplifier 200 are presented with the actual voltage appearing at the drain of the respective electronically controlled switch 50. In an alternative embodiment, compensating unidirectional electronic valves 160 are not supplied, and the values of short circuit reference voltage sources 320 and reference voltage sources 210 are set accordingly.

Short circuit detector 300 is arranged to compare the voltage appearing at the drain of the respective electronically controlled switch 50 with a short circuit value, indicative that more than a pre-determined maximum allowed number of constituent LEDs of an LED string 30 have short circuited, and assert signal SHORT in the event that any of the LED strings 30 are detected as having more than the pre-determined maximum allowed number of shorted constituent LEDs. In particular, when an LED string 30 exhibits a short circuited LED, the voltage at the drain of the associated electronically controlled switch will rise. Responsive to the assertion of signal SHORT and in cooperation with AND gates 130, signals EN1 and EN2 are arranged to disable comparing circuits 120, thereby ceasing current flow through plurality of LED strings 30.

Comparing circuit 170 is arranged to compare the voltages appearing at the drains of the respective electronically controlled switches 50 and control steering module 180 to pass the lower of the voltages appearing at the drains of the respective electronically controlled switches 50, preferably compensated for by compensating unidirectional electronic valves 160, to transconductance error amplifier 200. Transconductance amplifier 200 is arranged to compare the lower of the voltages appearing at the drains of the respective electronically controlled switches 50, preferably compensated for by compensating unidirectional electronic valves 160, with the voltage output by reference voltage source 210, representing the target current to be passed through each of LED strings 30, and output a feedback error signal whose value is reflective of the difference. First electronically controlled switch 220 is arranged in an operating mode to pass the feedback error signal output by transconductance error amplifier 200 to sample and hold circuit 260 responsive to the output of delay circuit 140. Sample and hold circuit 260 maintains the value of the output feedback error signal between respective samples provided by the output of delay circuit 140, and feeds the maintained value to power source 20 via power controlling module 340 so as to control the voltage output responsive to the lower of the voltages appearing at the drains of the respective electronically controlled switches 50, preferably compensated for by compensating unidirectional electronic valves 160.

In a start up condition of power source 20, when VSAMPLE is less than the voltage output by reference voltage source 250, in one embodiment set to 80% of the nominal value of the output of power source 20, without limitation, second electronically controlled switch 220 is arranged to maintain a constant path for the output current of transconductance amplifier 200 to power source 20, thus increasing the response rate of power source 20 to the output of transconductance error amplifier 200.

In an exemplary embodiment (not shown), power source 20 comprises a boost converter, whose electronically controlled switch is modulated responsive to a comparison of the output of sample and hold circuit 260, optionally amplified or shifted by power controlling module 340, and a saw tooth waveform. The electronically controlled switch and inductor of power source 20 may be provided external to LED driver 10 without limitation. Power controlling module 340 may be constituted of a buffer or an electrical connection without limitation.

Each comparing circuit 120 is arranged to adjust the current flowing through the associated LED string 30 responsive to a comparison of the voltage representation of the current flow across the respective sense resistor 60 with the voltage output by the respective target current reference voltage source 110. Each comparing circuit 120 is alternately enabled or disabled responsive to the respective one of received PWM signals PWM1 and PWM2. When the respective PWM signal is not active, comparing circuit 120 is arranged to set the associated electronically controlled switch 50 to be open. When the respective PWM signal is active, comparing circuit 120 is arranged to at least partially close the respective electronically controlled switch 50 so as to allow current flow there through. In particular, the on resistance of the respective electronically controlled switch 50 is automatically controlled by the closed loop arrangement in cooperation with the respective sense resistor 60 so that current through sense resistor 60 does not exceed the value set by the respective target current reference voltage source 110.

Figure 2:
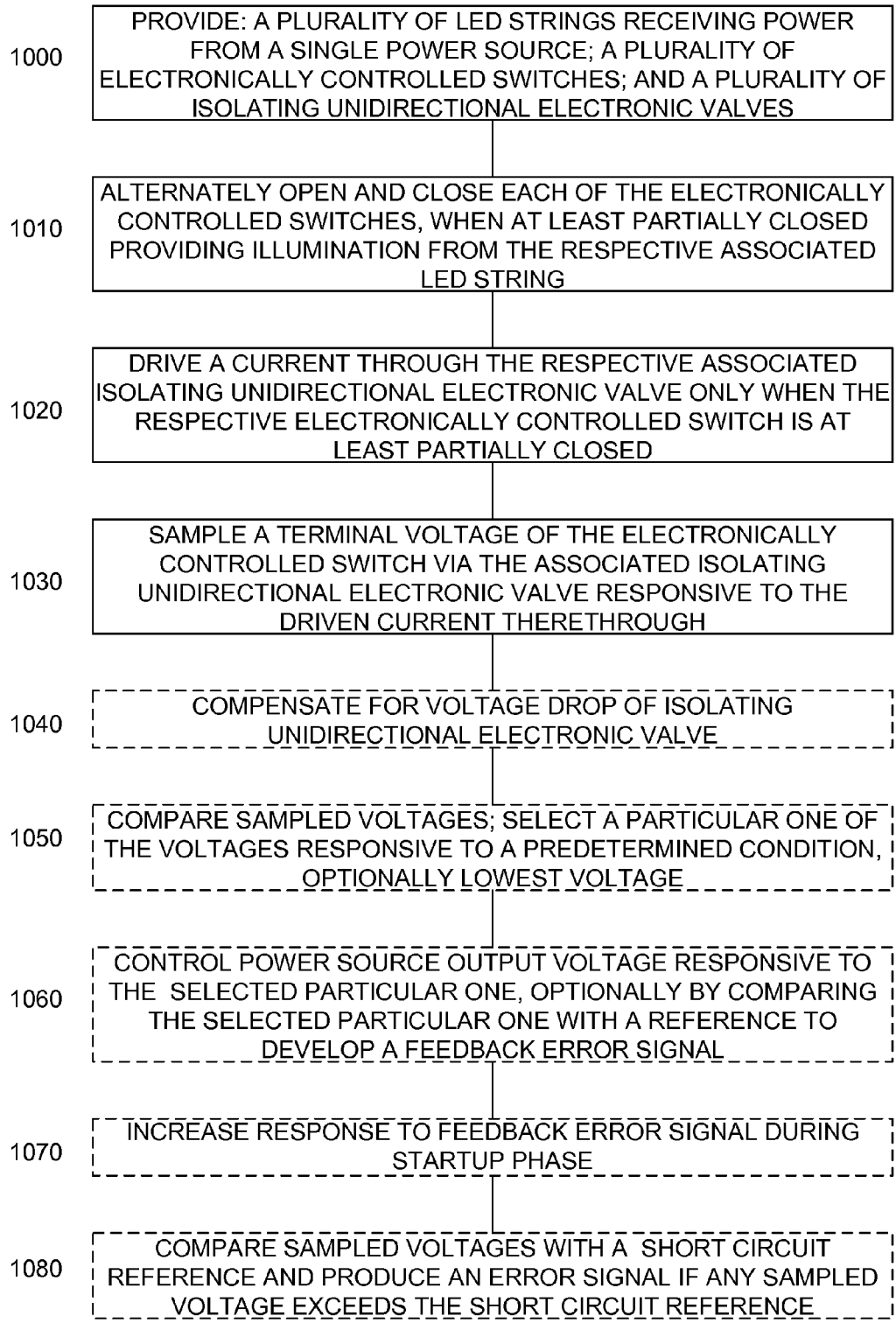
FIG. 2 illustrates a high level flow chart of an exemplary embodiment of a method of controlling and sampling a plurality of LED strings coupled to a single power source.

FIG. 2 illustrates a high level flow chart of an exemplary embodiment of a method of controlling and sampling a plurality of LED strings coupled to a single power source. In stage 1000 a plurality of LED strings, such as LED strings 30, receiving power from a single power source, such as power source 20; a plurality of electronically controlled switches, such as electronically controlled switches 50; and a plurality of isolating unidirectional electronic valves, such as isolating unidirectional electronic valves 40, are provided. Each of the plurality of electronically controlled switches and isolating unidirectional electronic valves are mutually associated with a particular one of the LED strings.

In stage 1010 each of the provided electronically controlled switches of stage 1000 are alternately opened and closed, the associated LED string providing illumination when the electronically controlled switch is at least partially closed. In one embodiment, each of the provided electronically controlled switches of stage 1000, when closed, are controlled so as to exhibit an on-resistance so as to control the current flowing there through, thus being only partially closed. In stage 1020 a current is driven through the respective associated isolating unidirectional electronic valve only when the respective provided LED string is providing illumination, such as by controllable current sources 150, and preferably with a delay from the beginning of the illumination so as to allow for dissipation of any transients.

In stage 1030 a terminal voltage of the electronically controlled switch is sampled via the respective associated isolating unidirectional electronic valve, responsive to the driven current of stage 1020.

In stage 1040, illustrated as optional by the dashed box, the voltage drop associated with isolating unidirectional electronic valve is compensated for, such as by compensating unidirectional electronic valve 160. In stage 1050, illustrated as optional by the dashed box, the sampled voltages are compared and a particular one of the sampled voltages is selected responsive to a predetermined condition, preferably the predetermined condition is the lowest voltage.

In stage 1060, illustrated as optional by the dashed box, the output voltage of the power source of stage 1000 is controlled responsive to the selected voltage of stage 1050. Preferably, control of the power source is responsive to comparing the selected voltage with a reference voltage to develop a feedback error signal.

In stage 1070, illustrated as optional by the dashed box, the response to the feedback error signal is increased during a startup phase. In an exemplary embodiment this is accomplished by the use of second electronically controlled switch 220 to maintain the output current of transconductance error amplifier 200 between sampling periods.

In stage 1080, illustrated as optional by the dashed box, the sampled voltages are each compared with a short circuit reference voltage, such as by short circuit detector 300, and in the event that any of the sampled voltages exceeds the short circuit reference voltage, an error signal is produced. In an exemplary embodiment, the error signal interferes with the closing of the electronically controlled switches of stage 1010.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A light emitting diode (LED) driver arrangement comprising:
   a control circuit;
   a power source;
   a plurality of LED strings, a first end of each of the plurality of LED strings coupled to a common output of said power source;
   a plurality of controllable current sources, each responsive to said control circuit;
   a plurality of electronically controlled switches, a control terminal of each of said plurality of electronically controlled switches coupled to a respective output of said control circuit; and
   a plurality of isolating unidirectional electronic valves,
   each of said plurality of controllable current sources, said plurality of electronically controlled switches and said plurality of isolating unidirectional electronic valves mutually associated with a respective one of said plurality of LED strings,
   a first terminal of each of said plurality of electronically controlled switches coupled to a second end of the respective associated LED string,
   a first end of each of said plurality of isolating unidirectional electronic valves coupled to the respective associated controllable current source and a second end of each of said plurality of isolating unidirectional electronic valves coupled to said first terminal of said respective associated electronically controlled switch, each of said plurality of isolating unidirectional electronic valves arranged to conduct only when the electric potential at said second end is lower than the electric potential at said first end,
   said control circuit arranged to alternately open and close each of said plurality of electronically controlled switches, each of said respective associated LED strings thereby producing illumination when the associated electronically controlled switch is at least partially closed, and
   said control circuit further arranged to operate the respective controllable current source only when said respective associated electronically controlled switch is at least partially closed.

2. The LED driver arrangement of claim 1, further comprising:
   a first comparing circuit, each of the inputs of said first comparing circuit coupled to said first end of a respective one of said plurality of isolating unidirectional electronic valves, said respective isolating unidirectional electronic valve arranged to couple a voltage appearing at said first terminal of the associated electronically controlled switch to the respective input of said first comparing circuit when said respective isolating unidirectional electronic valve conducts responsive to said respective associated controllable current source; and
   a power controlling module arranged to control the output voltage of said power source, said power controlling module responsive to the output of said first comparing circuit.

3. The LED driver arrangement of claim 1, further comprising:
   a first comparing circuit, each of the inputs of said first comparing circuit coupled to said first end of a respective one of said plurality of isolating unidirectional electronic valves, said respective isolating unidirectional electronic valve arranged to couple a voltage appearing at said first terminal of the associated electronically controlled switch to the respective input of said first comparing circuit when said respective isolating unidirectional electronic valve conducts responsive to said respective associated controllable current source;
   a steering module responsive to said first comparing circuit, each of the inputs of said steering module coupled to a respective input of said first comparing circuit, said steering module arranged to output a signal whose value represents a voltage appearing on said first terminal of a particular one of said associated electronically controlled switches, said particular one selected responsive to said first comparing circuit; and
   a power controlling module arranged to control the output voltage of said power source responsive to said output signal.

4. The LED driver arrangement of claim 3, further comprising a plurality of compensating unidirectional electronic valves, each of said compensating unidirectional electronic valves coupled between a respective one of said isolating electronically controlled valves and the respective input of said steering circuit, and arranged to compensate for the voltage drop across said respective isolating electronically controlled valve.

5. The LED driver arrangement of claim 4, wherein said first comparing circuit is arranged to identify the input exhibiting the lowest voltage, and set said steering module to select the identified input exhibiting the lowest voltage.

6. The LED driver arrangement of claim 3, wherein said first comparing circuit is arranged to identify the input exhibiting the lowest voltage, and set said steering module to select the identified input exhibiting the lowest voltage.

7. The LED driver arrangement of claim 3, further comprising:
   an error amplifier coupled to the output of said steering module,
   said error amplifier arranged to compare said output signal of said steering module with a reference and output a feedback error signal to said power controlling module reflective of the difference between the output of said steering module and the reference,
   said arrangement to control the output voltage of said power source responsive to said output signal being responsive to said output feedback error signal.

8. The LED driver arrangement of claim 7, further comprising a start up bypass, said start up bypass arranged to increase the rate of response of said power controlling module to said feedback error signal during a start up phase.

9. The LED driver arrangement of claim 7, further comprising a sample and hold circuit coupled to the output of said error amplifier and arranged to sample and hold said feedback error signal, said power controlling module receiving said sampled and held feedback error signal.

10. The LED driver arrangement of claim 3, further comprising a second comparing circuit, each of the inputs of said second comparing circuit coupled to said first end of a respective one of said plurality of isolating unidirectional electronic valves, said respective isolating unidirectional electronic valve arranged to couple a voltage appearing at said first terminal of the associated electronically controlled switch to the respective input of the second comparing circuit when said isolating unidirectional electronic valve conducts responsive to said respective associated current source, said second comparing circuit arranged to compare each of said respective inputs with a short circuit reference, and output an error signal when any of said inputs exceeds said short circuit reference.

11. A method of controlling and sampling a plurality of light emitting diode (LED) strings coupled to a single power source, the method comprising:

providing a plurality of LED strings, a first end of each of the plurality of LED strings coupled to a common output of the power supply;
providing a plurality of electronically controlled switches;
providing a plurality of isolating unidirectional electronic valves, each of said provided plurality of electronically controlled switches and said provided plurality of isolating unidirectional electronic valves mutually associated with a respective one of said provided plurality of LED strings, each of said provided plurality of electronically controlled switches in communication with the associated LED string and the associated isolating unidirectional electronic valve;
alternately opening and closing each of said plurality of provided electronically controlled switches, each of said respective associated provided LED strings producing illumination when the associated provided electronically controlled switch is at least partially closed;
driving a current through the respective provided isolating electronic valve only when the respective electronically controlled switch is at least partially closed; and
sampling a terminal voltage of the respective associated provided electronically controlled switch via the respective associated provided isolating unidirectional electronic valve responsive to said driven current through the respective associated provided isolating electronic valve.

12. The method of claim 11, further comprising:
comparing said sampled terminal voltages of said provided plurality of electronically controlled switches;
selecting a particular one of said provided electronically controlled switches responsive to a particular condition of said comparing; and
controlling the output voltage of the single power source responsive to said sampled terminal voltage of said selected particular one of said provided electronically controlled switches.

13. The method of claim 12, further comprising compensating for the voltage drop of said respective isolating unidirectional electronic valve associated with said selected particular one of said provided electronically controlled switches.

14. The method of claim 12, wherein said particular condition is the lowest voltage.

15. The method of claim 12, further comprising:
comparing a function of said sampled terminal voltage of said selected particular one of said provided electronically controlled switches with a reference voltage to develop a feedback error signal, the value of said feedback error signal reflecting the difference between the compared function of said sampled terminal voltage and said reference voltage,
wherein said controlling the output voltage is responsive to said developed feedback error signal.

16. The method of claim 15, further comprising increasing the impact of said feedback error signal on said output voltage during a start up phase.

17. The method of claim 12, further comprising:
comparing each of said sampled terminal voltages with a short circuit reference; and
producing an error signal when any of said inputs exceeds said short circuit reference.

18. A driver arrangement comprising:
a control circuit;
a plurality of LED strings, a first end of each of the plurality of LED strings coupled to a common output of a power source;
a plurality of controllable current sources, each responsive to said control circuit;
a plurality of electronically controlled switches, a control terminal of each of said plurality of electronically controlled switches coupled to a respective output of said control circuit; and
a plurality of isolating unidirectional electronic valves,
each of said plurality of controllable current sources, said plurality of electronically controlled switches and said plurality of isolating unidirectional electronic valves mutually associated with a respective one of said plurality of LED strings,
a first terminal of each of said plurality of electronically controlled switches coupled to a second end of the respective associated LED string,
a first end of each of said plurality of isolating unidirectional electronic valves coupled to the respective associated controllable current source and a second end of each of said plurality of isolating unidirectional electronic valves coupled to said first terminal of said respective associated electronically controlled switch, each of said plurality of isolating unidirectional electronic valves arranged to conduct only when the electric potential at said second end is lower than the electric potential at said first end,
said control circuit arranged to alternately open and close each of said plurality of electronically controlled switches, each of said respective associated LED strings thereby producing illumination when the associated electronically controlled switch is at least partially closed, and
said control circuit further arranged to operate the respective controllable current source only when said respective associated electronically controlled switch is at least partially closed.

19. The driver arrangement of claim 18, further comprising:
a first comparing circuit, each of the inputs of said first comparing circuit coupled to said first end of a respective one of said plurality of isolating unidirectional electronic valves, said respective isolating unidirectional electronic valve arranged to couple a voltage appearing at said first terminal of the associated electronically controlled switch to the respective input of said first comparing circuit when said respective isolating unidirectional electronic valve conducts responsive to said respective associated controllable current source; and a power controlling module arranged to control the output voltage of said power source, said power controlling module responsive to the output of said first comparing circuit.

20. The driver arrangement of claim 18, further comprising:

a first comparing circuit, each of the inputs of said first comparing circuit coupled to said first end of a respective one of said plurality of isolating unidirectional electronic valves, said respective isolating unidirectional electronic valve arranged to couple a voltage appearing at said first terminal of the associated electronically controlled switch to the respective input of said first comparing circuit when said respective isolating unidirectional electronic valve conducts responsive to said respective associated controllable current source;

a steering module responsive to said first comparing circuit, each of the inputs of said steering module coupled to a respective input of said first comparing circuit, said steering module arranged to output a signal whose value represents a voltage appearing on said first terminal of a particular one of said associated electronically controlled switches, said particular one selected responsive to said first comparing circuit; and a power controlling module arranged to control the output voltage of the power source responsive to said output signal.

* * * * *